Figure 1:
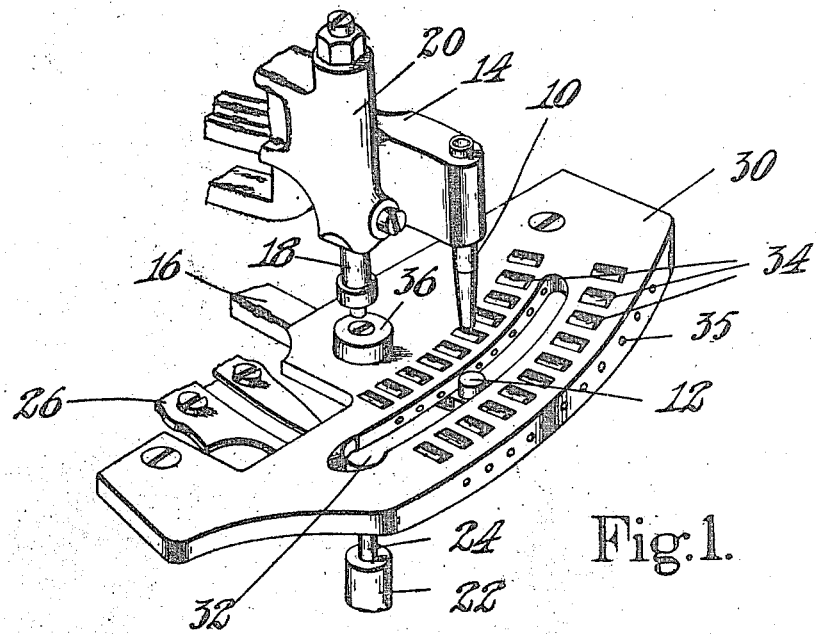

W. SHAW.
MACHINE FOR OPERATING ON SHEET MATERIAL.
APPLICATION FILED JULY 20, 1911.

1,183,246. Patented May 16, 1916.

WITNESSES.
O. Blanche Hargraves.
Elizabeth C. Coupe.

INVENTOR.
Walter Shaw
By his Attorney,
Nelson W. Howard

UNITED STATES PATENT OFFICE.

WALTER SHAW, OF BOSTON, MASSACHUSETTS, ASSIGNOR TO UNITED SHOE MACHINERY COMPANY, OF PATERSON, NEW JERSEY, A CORPORATION OF NEW JERSEY.

MACHINE FOR OPERATING ON SHEET MATERIAL.

1,183,246.

Specification of Letters Patent. Patented May 16, 1916.

Application filed July 20, 1911. Serial No. 639,642.

*To all whom it may concern:*

Be it known that I, WALTER SHAW, a citizen of the United States, residing at Boston, in the county of Suffolk and State of Massachusetts, have invented certain Improvements in Machines for Operating on Sheet Material, of which the following description, in connection with the accompanying drawings, is a specification, like reference characters on the drawings indicating like parts in the several figures.

This invention relates to machines for operating on sheet material and is herein shown as embodied in a machine for punching and eyeleting rubber sheets or similar material although the invention is not limited to this class of machine but is of general application.

An object of the invention is to provide improved means for supporting the work and guiding it as it is fed to the operating tools of the machine. In operating upon a tacky or sticky material, such for example as unvulcanized rubber used in the manufacture of certain rubber goods, it has been found difficult to feed the material accurately and without distortion because of the adhesion between the material and the work table upon which it is supported and over which it is moved. With a view to preventing this objectionable adhesion and reducing the frictional resistance to relative movement of the material and work table the present invention contemplates the provision of work engaging means projecting above the surface of the work table and arranged to prevent the lower surface of the material, or a portion of the material, from coming into continuous contact with the surface of the work table.

In eyeleting machines and the like there is commonly employed a vibrating or oscillating work feeding tool which is arranged to engage the work and then move laterally carrying the work with it. In embodying the invention in a machine of this type the means for maintaining the lower surface of the material out of contact with the work table may be arranged advantageously on either side of the path of said feeding tool and preferably parallel therewith.

As herein shown the work engaging members comprise a series of rollers mounted in the work table with their peripheries projecting above the surface thereof to sustain the material being operated upon, the rollers being arranged to turn about axes disposed substantially normally to the path of feeding movement of the work. By this construction the adhesive friction of the material and work table is avoided, as well as the sliding friction between the material and the sustaining rollers, the latter being free to turn as the material is drawn over them. The strain upon the material during the feeding movement is therefore reduced to a minimum with the result that even materials having a very low tensile strength may be handled rapidly and accurately and without damage.

The features above enumerated and others incidental to the invention will be best understood and appreciated from the following description of a preferred embodiment thereof selected for purposes of illustration and shown in the accompanying figures in which:—

Figure 2:
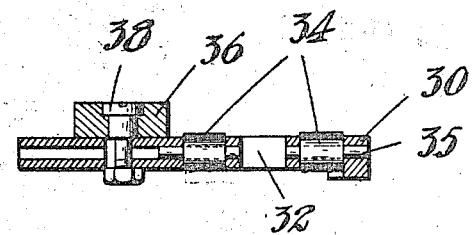

Figure 1 is a view in perspective of the operating parts of an eyeleting machine equipped with a work table embodying the present invention; Fig. 2 is a sectional view through the work table and edge gage.

The machine shown in the drawings is arranged to punch a hole in the work, feed the work to bring the punched holes into alinement with coöperating setting dies and then insert an eyelet in the hole and clench it upon the work.

The punch 10 and cutting block 12 are mounted respectively in the forward ends of the levers 14 and 16. The punch is depressed to meet the cutting block for punching the work and then the levers 14 and 16 are together swung laterally, while the punch still remains in the hole, to feed the work into alinement with the setting dies. At the completion of the feeding movement the punch is lifted and the levers 14 and 16 are returned to initial position.

The upper setting die 18 is mounted in the forward end of a lever 20 and is moved vertically downwardly simultaneously with the upward movement of the lower setting die 22, the dies meeting in substantially the plane of the cutting block 12. The lever 20 is moved laterally out of the path of the lever 14 during the feeding movement of the punch and cutting block, the setting die 22 being lowered beneath the path of the lever 16 during this operation. The lower setting die is provided with the usual spindle 24 which engages an eyelet at the end of the raceway 26 as the setting die is elevated so that the eyelet is drawn from the raceway, as the latter is retracted, and then inserted in the previously punched hole.

The punching and setting mechanism above described, in its specific form, constitutes no part of the present invention although its use in combination with the novel work supporting and guiding devices to be hereinafter described is a feature of the invention. For a further description of the punching and setting mechanism and actuating means therefor, reference may be had to United States Letters Patent No. 603,023 granted April 26, 1898, on an application of S. Field.

The work table 30 comprises a plate which may be secured to any convenient stationary part of the machine and is located with its upper surface substantially in the plane of the cutting block 12. The plate is provided with a slot 32 curved upon a radius equal to the distance of the punch and cutting block from the vertical axis about which the levers 14 and 16 are swung in the feeding operation. In this operation, therefore, the cutting block traverses the slot, the extent of its movement determining the spacing between successive eyelets. At its left end the slot terminates in an enlargement which permits the passage of the lower setting die in the setting operation.

Arranged in rows on either side of the slot 32 are a plurality of rollers 34 each disposed within a separate recess in the plate 30 and journaled to turn freely upon a pin 35 set in the plate. For convenience in manufacture the journals of each pair of rollers are arranged in alinement being cut off at the edges of the slot 32 and at the front edge of the plate, as shown in Fig. 2. The periphery of each roller 34 projects above the surface of the plate 30 so that the lower surface of the material being operated upon is held off from the surface of the plate and has no opportunity to adhere thereto.

As herein shown the path of the punch 10 in making its feeding movement is curved and the axes of the rollers are disposed radially or normally to the curved path, the intention being so to arrange the rollers that sliding of the material axially of the rollers is avoided.

The edge gage shown in the drawings comprises a cylindrical roller 36 mounted to turn about a vertical journal stud 38 which is adjustably mounted in a transverse slot formed in the plate 30. The roller 36 is located in the rear of the path of the punch 10 and serves to determine the distance from the edge of the work at which the eyelets are set by engaging the edge of the material as it is moved transversely by the punch. The roller 36 is free to turn as the material is moved past it so that it will exert no retarding effect thereon nor will it deface the edge upon which it acts.

It is believed that a plurality of rollers have never been employed to sustain the part of the material being operated upon out of contact with the surface of a work table and the following claims should therefore be construed to afford the protection warranted by the breadth of the invention.

Having described my invention, what I claim as new and desire to secure by Letters Patent of the United States is:

1. A work supporting table for a machine for setting eyelets and the like, comprising a plate with a curved slot, and a plurality of rows of elongated rollers disposed in arcs concentric with the slot for supporting the work on both sides of the slot.

2. A work supporting table for a machine for setting eyelets and the like, comprising a plate with an open slot, and a plurality of elongated rollers disposed in rows parallel to the slot and with the axis of each roller perpendicular to the slot.

3. A machine of the class described having, in combination, a work feeding tool, a work plate disposed beneath the tool, a row of rollers disposed in the rear of and adjacent to the path of the feeding tool, and a row of similar rollers disposed in front of the path of the feeding tool, the axes of all of said rollers being substantially perpendicular to the path of the feeding tool.

4. A machine of the class described having, in combination, eyelet setting dies, a work table, a work feeding device arranged to move across said table in a curved path to advance the work to setting position, and a plurality of rollers mounted to turn about separate axes extending at right angles to the curved path of said feeding device and spaced at intervals from each other.

5. A machine of the class described having, in combination, operating tools, a work supporting table having a slot therein, and a row of rollers mounted in said table on each side of said slot, the axes of each pair of oppositely arranged rollers being disposed in alinement.

6. An eyelet setting machine having, in combination, a reciprocating setting device, a work plate having a slot extending transversely to the path of the setting device, a series of oppositely disposed recesses in the plate at the sides of the slot, and elongated rollers in the recesses having journals which are alined in each pair of rollers.

7. A work supporting table for a machine for operating on flat pieces of sheet material, comprising a plate having a plurality of recesses formed therein, and a roller mounted in each recess with the major part of its body below the surface of the plate, the upper surface of each roller being disposed in a common plane which plane substantially includes the point at which the work is to be operated upon.

In testimony whereof I have signed my name to this specification in the presence of two subscribing witnesses.

WALTER SHAW.

Witnesses:
HERBERT W. KENWAY,
JAMES R. HODDER.